Jan. 18, 1944.  A. STEIG ET AL  2,339,659
APPARATUS AND METHOD FOR MECHANICAL BRAZING OF DIAMONDS
Filed March 13, 1943
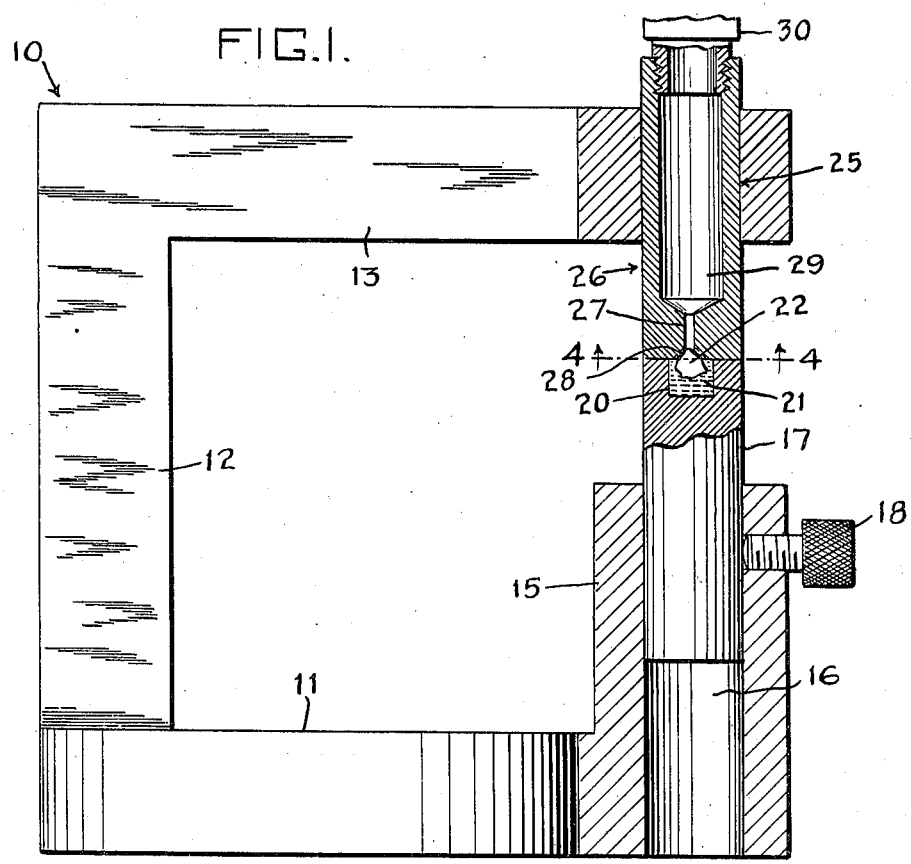
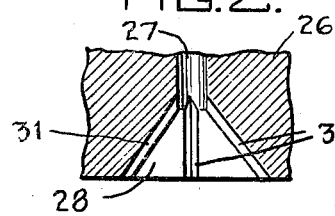
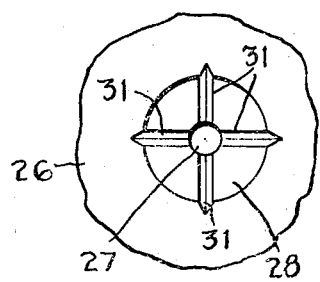
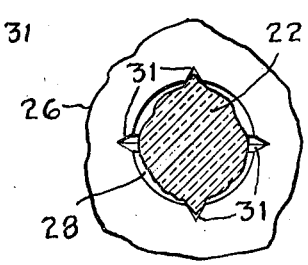
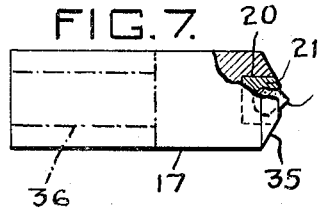
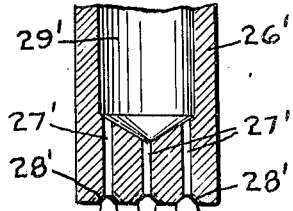
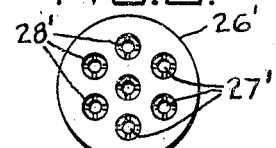
INVENTORS
ARTHUR STEIG
HENRY STEIG
BY
ATTORNEY Patented Jan. 18, 1944

2,339,659

UNITED STATES PATENT OFFICE 2,339,659

APPARATUS AND METHOD FOR MECHANICAL BRAZING OF DIAMONDS

Arthur Steig and Henry Steig, New York, N. Y.

Application March 13, 1943, Serial No. 479,133

3 Claims. (Cl. 76—1)

The invention relates to an apparatus and method for mechanical brazing of diamonds and it is particularly adapted for use in the preparation of diamond tools of which a great many are used in various industries.

The precious stones in cutting tools are set by different methods such as brazing, molding, casting, sintering or other means.

One of the most popular methods is the brazing process and as universally practised for a great many years and also at the present time is a hand method. It is a painstaking process, produces uneven results particularly with regard to the positioning of the diamond, and, since it subjects the diamond to a high degree of heat for the comparatively long period of time that is required to complete the painstaking setting, usually results in some injury to the diamond. This injury may not be apparent by examination and may not be evident upon first using the tool. However as diamond tools are quite expensive and are subject to most arduous usage the injury will ofttimes seriously impair the life and efficiency of the tool and this becomes a most serious drawback.

One of the objects of the invention is to provide an apparatus and method by which a much faster setting of the stones is accomplished thus effecting a great saving in labor costs and resulting in greatly increased production.

Another object of the invention is to provide an apparatus and method whereby the diamond is mechanically positioned in a practically perfect manner.

Still another important object is the saving of labor in finishing the tool. With hand brazing, due to the adhesion of the solder to the stone, and due to the surface tension of the solder a ridge is produced around the stone. Since this ridge is removed when the tool is finished the operator intentionally piles the solder higher around the stone during the setting so as to permit of its removal without excessive exposure of the diamond point. In accordance with the present invention a substantially clean "table" is produced around the stone, thus the amount of diamond exposure desired is obtained directly during the setting and the labor of finishing the face of the tool is considerably reduced.

Another object is the reduction in labor of machining "precision-centered" tools. In certain standard types of wheel dressing tools it is necessary to have the diamond point located within two or three thousandths of an inch of the center of the periphery of the tool. The customary procedure for making these tools is to set the diamond in a holder about $\frac{1}{16}$" larger in diameter than the desired diameter of the finished tool. After the diamond has been brazed in position the holder is then chucked in a lathe and the diamond point brought into line with the axis of the lathe spindle. After the point has been thus centered in the lathe the holder is turned down to the desired dimension, the result being that the finished peripheral surface of the tool and the diamond point are brought into correct relationship. This turning operation must be performed with a plurality of light cuts so as not to "kick" the diamond out of position. In accordance with the present invention the diamond is set so close to an absolute center that a holder only several thousandths of an inch oversize may be used, and the turning to the finished diameter can be accomplished with one light cut on the lathe.

Still another object is the adaptability of the apparatus and method for the production of cluster tools. It is practically impossible to make cluster tools, that is tools with two or more diamonds set symmetrically in the face of the holder, by hand brazing. In accordance with the invention the production of cluster tools by mechanical brazing becomes a simple process. It is much faster than sintering and affords a much more perfect setting. It is much simpler and less expensive than casting or molding both in terms of equipment required and in terms of labor for producing the finished tool.

In addition to the foregoing other objects and advantages will become apparent as this specification proceeds. Referring to the drawing forming a part thereof and in which one embodiment of the invention is illustrated:

Fig. 1 is a lonigtudinal sectional view with parts in elevation showing the tool and setter in position in a jig;

Fig. 2 is a fragmentary detail longitudinal sectional view on an enlarged scale showing the diamond seat;

Fig. 3 is a bottom plan view of Fig. 2;

Fig. 4 is an end view of the setter, the diamond being in section, and is taken on line 4—4 of Fig. 1;

Fig. 5 is a fragmentary longitudinal sectional view of the lower part of a setter for cluster tools showing the diamonds held in position;

Fig. 6 is a bottom plan view of Fig. 5, the diamonds being omitted; and

Fig. 7 is an elevational view with a part broken out of a finished tool, another shape of tool being indicated by the broken lines in this figure.

Referring again to said drawing the reference numeral 10 designates a jig. The jig may be of any desired shape or formation and as illustrated comprises a base portion 11, upright member 12, and a supporting arm 13.

The base is provided with a boss 15 which has a central longitudinal opening 16 which functions as a centering means for the diamond holder 17. The holder is firmly held in the proper position in the centering device by a set screw 18.

The diamond holder 17 is prepared in the customary manner as it would be for hand brazing. A small orifice 20 is drilled in the end of a metal rod and molten solder 21 is placed in this orifice. In hand brazing which as heretofore stated has been universally in vogue for a great many years, the diamond 22 is grasped with a pair of tweezers and positioned in the molten solder with its best cutting point projecting beyond the solder and the end of the tool. The operator depends entirely upon his eye and the skill of his fingers in locating and positioning the stone, the result being the stone is often not located at the true center of the tool. The solder must be kept in a molten state for a comparatively long period of time while the operator is attempting to properly locate and position the stone. Ofttimes it is necessary to reheat and remelt the solder to correct imperfections or to add to the solder for additional strength. Subjecting the diamond to this extreme heat for such a period of time is harmful to the diamond as heretofore described. Due to the hand operation when puddling the solder in positioning the stone, the face of the tool becomes mussy and uneven. With the present invention a clean setting is provided and this results in a minimum amount of machining being required in the finishing of the face of the tool.

In the illustrated embodiment of the invention the supporting arm 13 has an opening 25 in line with and concentric with the opening 16 for the diamond holder 17. Slidably mounted in the opening 25 is the mechanical setter 26.

The setter 26 has a small hole 27 drilled in its lower end and this hole terminates in a seat 28. The upper end of the duct 27 communicates with a suction chamber 29 to which a suction line 30 leads. The seat 28, as in our copending application filed as of even date, might be formed in a removable flat headed set screw of which a group may be provided, each one being interchangeable and having different sized seats to accommodate diamonds of varying sizes.

The seat 28 preferably has a plurality of radial grooves 31 cut therein. These grooves permit of engagement with edges or corners of the diamond as shown in Fig. 4 and provide for a more positive positioning and holding of the diamond in its seat, preparatory to the mechanical brazing operation.

In the operation of the device the mechanical setter 26 is elevated or removed from its opening 25 in the supporting arm 13 and the diamond 22 is properly positioned in its seat 28 and positively held there by the suction stream. The seat is conical in cross section and of such a depth as to properly hold the diamond so that its cutting point will be correctly exposed when set in the holder. The molten solder 21 is placed in the orifice 20 of the tool holder and the setter with its stone is pushed down through its guide opening 25 until the base of the setter rests on the rim of the holder. After a few seconds required for the solder to harden the setter is removed.

The slight pressure of the setter insures a perfect adhesion of the solder to all parts of the diamond except its exposed cutting point. The exposed solder surrounding the cutting point of the diamond will be smooth, and it is thought to be obvious very little machining will be needed to complete the face of the tool.

Figs. 5 and 6 show the invention as applied to cluster tools. As heretofore stated it has been practically impossible to make a cluster tool of this type by the brazing method, and molding or casting require more time and more expensive equipment. Sintering requires more time and does not give as accurate positioning of the diamond points. The tool and method of using same are similar to that described in connection with a single stone except for the fact that a plurality of ducts 27' are provided, the number and arrangement of same depending upon the number and arrangement of stones desired in the particular tool. Each duct has its seat 28' to accommodate the diamonds 22'. It is thought to be apparent that each of the diamonds 22' may be perfectly positioned and must remain that way in the completed tool.

Fig. 7 illustrates a completed tool. The edges of the table are chamfered off as indicated at 35, the degree of chamfering depending upon the use to which the tool is to be put. The broken lines in this figure indicate a tool having a shank 36. These shanked tool holders are preferably made in quantity on a turret lathe before the diamonds are brazed in the body portion. With the uncertainty of the amount necessary to be removed from the end of the tool due to the faults of hand brazing the length of the body portion will often vary in the finished tool. In making accurate shanked tool holders with the present hand brazing method it is therefore usual to braze the diamond into a tool holder of round stock and turn the shank down after the diamond has been set. This is a much more expensive operation as the holders cannot be formed in quantity production on a turret lathe. With the present invention the exposure of the stone is so uniform that holders prepared in quantity may be used.

Changes in details of construction and arrangements of parts such as would occur to one skilled in the art are to be considered as coming within the spirit of the invention as expressed in the appended claims.

We claim:

1. An apparatus for mechanically setting diamonds in molten brazing material in accurately determined positions, said apparatus comprising, suction means for holding the diamonds in the desired positions, means for connecting said suction holding means to a source of subnormal air pressure, a tool member into which the diamonds are to be secured by brazing material, and means for accurately aligning said suction holding means with said tool member so that the diamonds may be brought into proper position to be brazed in said tool.

2. An apparatus for mechanically setting diamonds in molten brazing material in accurately determined positions, said apparatus comprising, suction means for holding the diamonds in the desired positions, said suction means forming a mechanical setter with seats and radial grooves in said seats to facilitate the positioning of diamonds therein, means for connecting said suction holding means to a source of subnormal air pressure, a tool member into which the diamonds are to be secured by brazing material, and means for accurately aligning said suction holding means with said tool member so that the diamonds may be brought into proper position to be brazed in said tool.

3. A method for mechanically setting diamonds in molten brazing material in accurately determined positions, said method comprising the insertion of the diamonds into seats in a suction holding means for holding them in the desired position, holding said diamonds in said seats by suction provided from a source of subnormal air pressure, and moving said suction means and diamonds into engagement with a tool containing molten brazing material so that the diamonds may be brought into proper position to be brazed in said tool, said suction holding means being accurately aligned with said tool.

ARTHUR STEIG.
HENRY STEIG.